July 20, 1926.

F. E. THOMES 1,593,317

WOODWORKING MACHINE

Filed Oct. 10, 1924

Inventor.
Frank E. Thomes
By S. W. Bates
ATTY.

July 20, 1926.
F. E. THOMES
1,593,317
WOODWORKING MACHINE
Filed Oct. 10. 1924
5 Sheets-Sheet 2
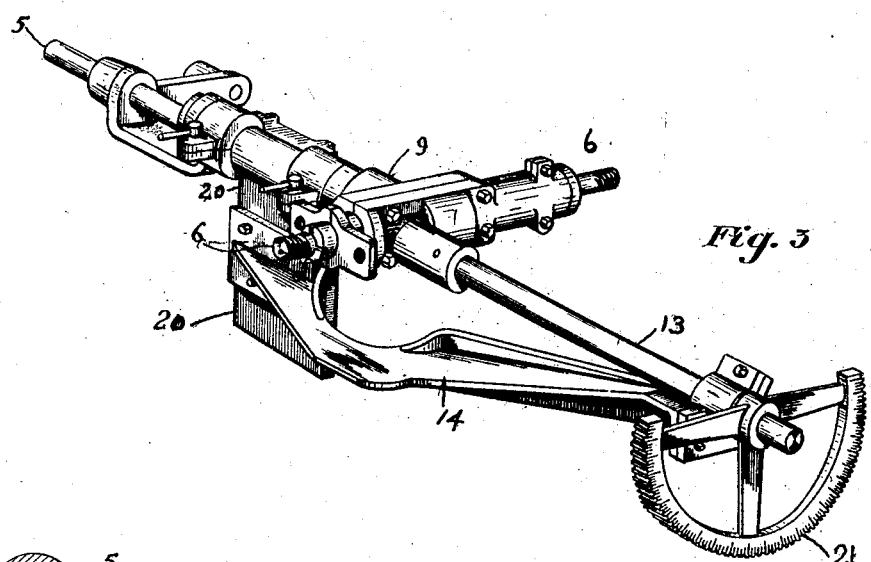
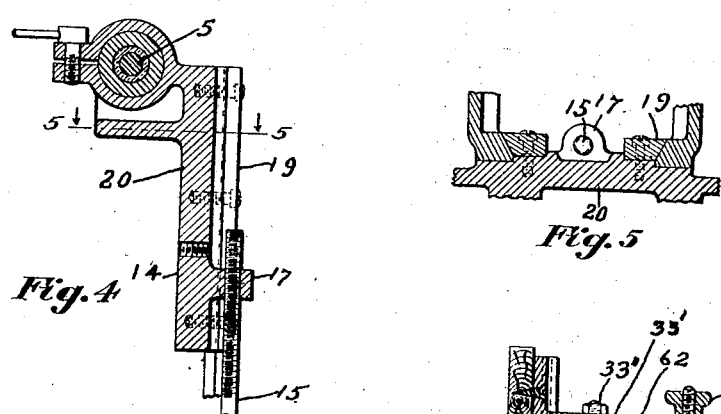
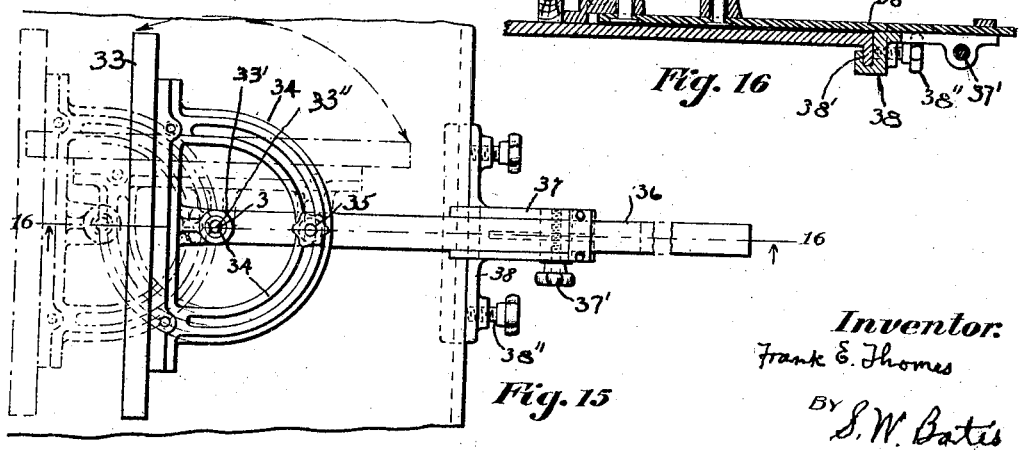
*Inventor:*
Frank E. Thomes
BY S. W. Bates
ATTY.

July 20, 1926.
F. E. THOMES
1,593,317
WOODWORKING MACHINE
Filed Oct. 10, 1924
5 Sheets-Sheet 3
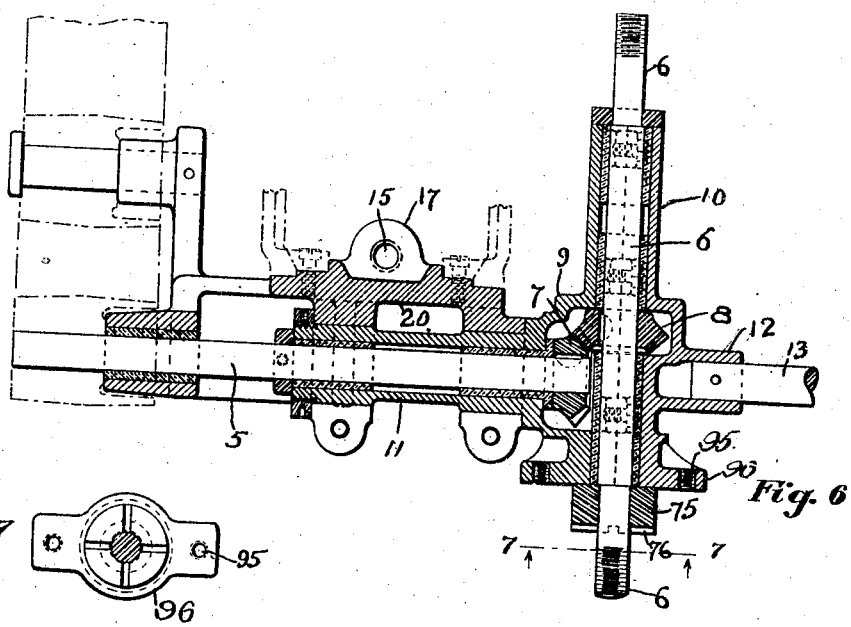
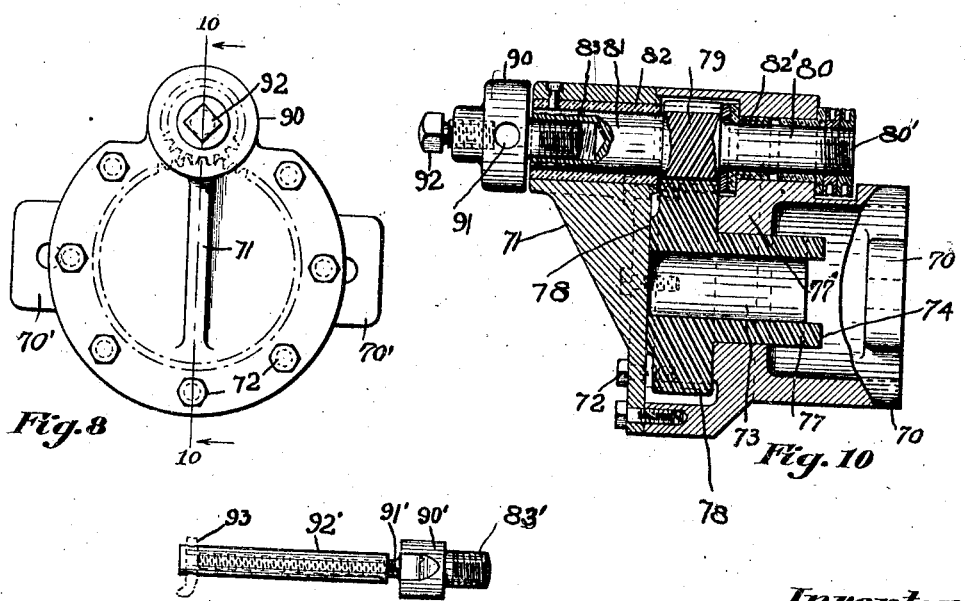
Inventor:
Frank E. Thomes
By S. W. Bates
ATTY.

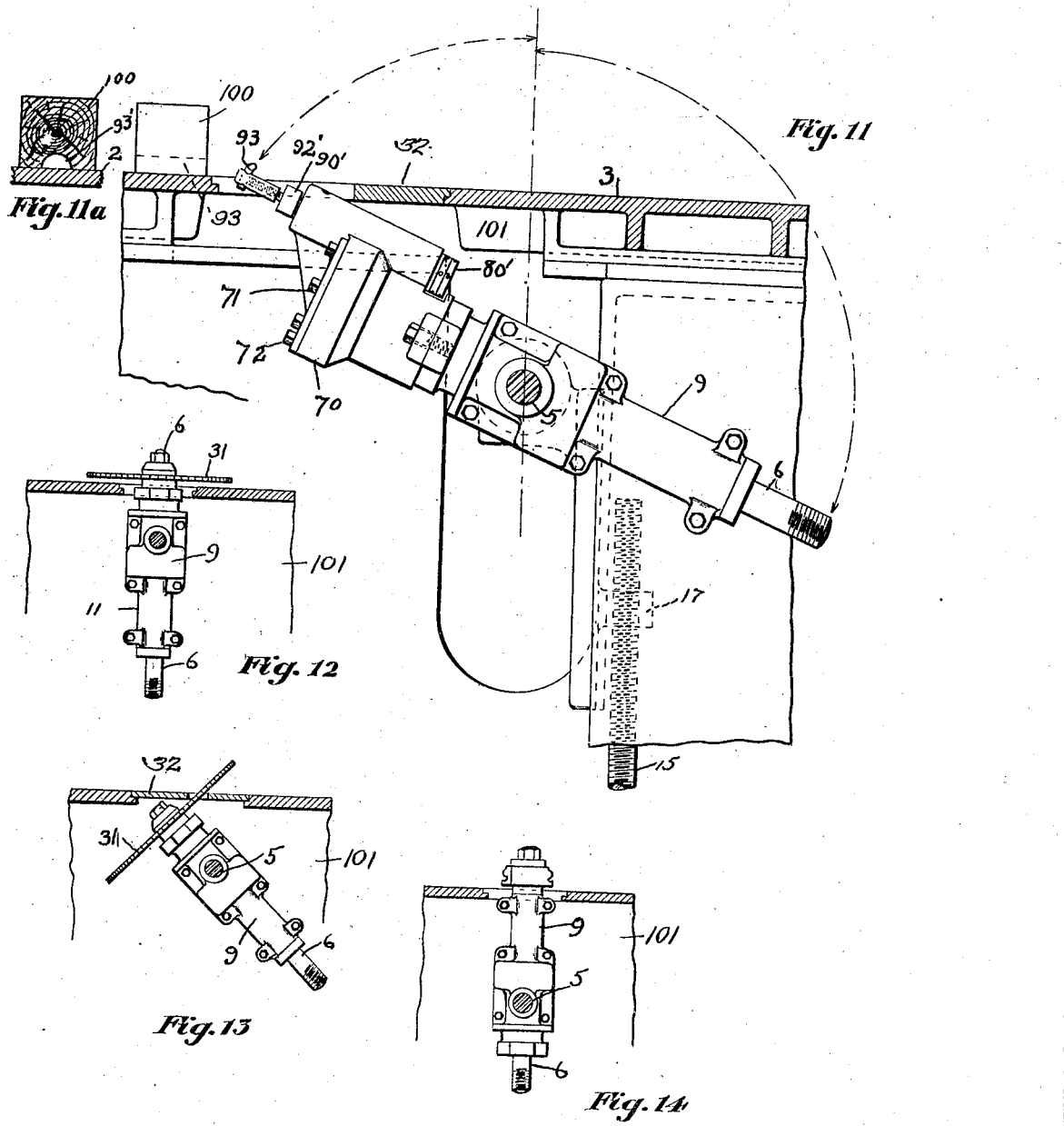

July 20, 1926.

F. E. THOMES 1,593,317

WOODWORKING MACHINE

Filed Oct. 10. 1924      5 Sheets-Sheet 5

Inventor.
Frank E. Thomes
By S. W. Bates
ATTY.

Patented July 20, 1926.

1,593,317

UNITED STATES PATENT OFFICE.

FRANK E. THOMES, OF PORTLAND, MAINE.

WOODWORKING MACHINE.

Application filed October 10, 1924. Serial No. 742,927.

My invention relates to the combination of a wood sawing machine, a core box machine and an irregular moulder, the machine being the same type as that shown in my Patent No. 1,420,591, dated June 20, 1921.

My present machine, however, has various points of improvements over said No. 1,420,591, particularly in the manner in which the saw may be used and in the way in which the saw fence or guide is connected to the table whereby all grooves in the table proper are eliminated.

The various improvements are brought about largely through the following features of construction; by building the table in two parts each part being so mounted that it will slide from and toward the other; by making the table a perfect square or rectangular with a downward projecting rib extending parallel and adjacent to the side or edge of the table whereby each rib acts as a guide to the saw fence or guide to direct the wood being sawed, parallel with one of the sides or edges of the table; by having a main shaft with a saw or tool arbor at right angles thereto; by having a tilting shaft coincident with said main shaft whereby the saw can be turned vertically into any angle with relation to the table, parallel at right angles or at any desired angle.

I have illustrated my invention by means of the accompanying drawing in which:—

Fig. 3 is a perspective view of the main driving shaft and adjacent parts,

Fig. 4 is a section on the line 4—4 of Fig. 2,

Fig. 5 is a section on the line 5—5 of Fig. 4,

Fig. 6 is a central, longitudinal section through the main shaft and saw arbor with the tilting shaft in plan, Fig. 7 is a section on the line 7—7 of Fig. 6, Fig. 8 is an end elevation of Fig. 10, Fig. 9 is a side elevation of the rotating cutters for cutting core boxes of small diameter, as shown in Fig. 11, Fig. 10 is a section on the line 10—10 of Fig. 8, Fig. 11 is a section taken on the line 11—11 of Fig. 3 showing the small diameter core box cutter in place of the saw on the saw arbor.

Fig. 11$^a$ is a cross section or portion of the table and wood block channeled out by small diameter cutter, Fig. 12 is an elevation of the saw arbor when in its upright position, Fig. 13 is the same with the shaft inclined to an angle of 45 degrees, Fig. 14 is the same view as Fig. 12 with the saw replaced by an irregular moulder head at the opposite end of a saw arbor from the saw as in Fig. 13, that is, with a vertical moulder head in position to be operated.

Figure 1:
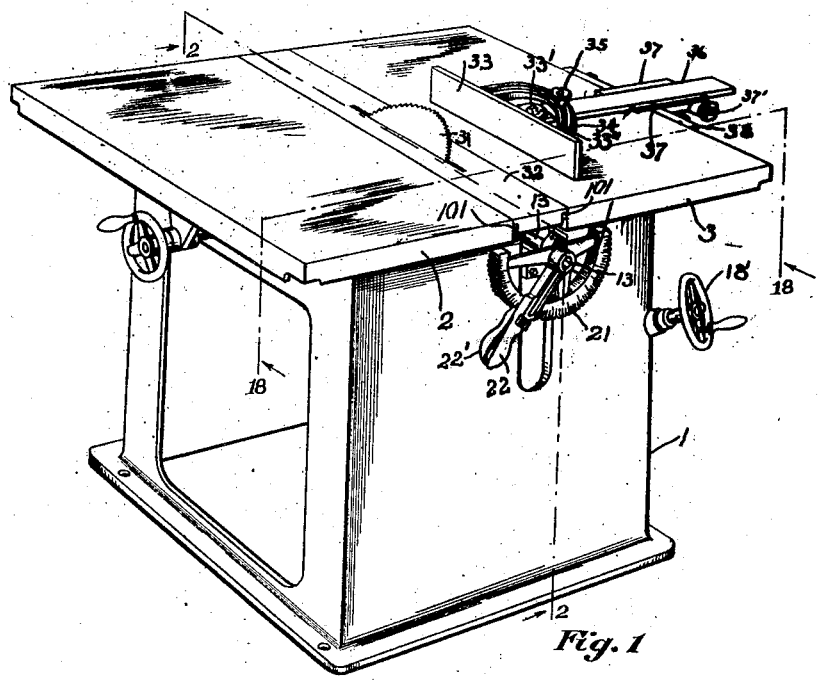
Fig. 1 is a perspective view of my sawing machine in one of its preferable forms.
Figure 17:
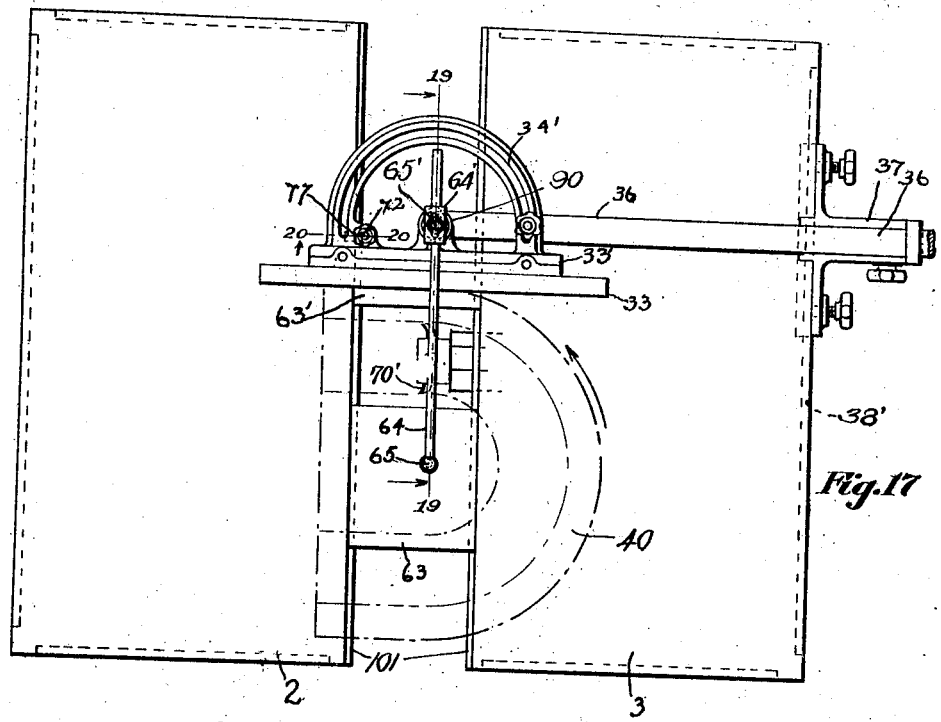
Figure 18:
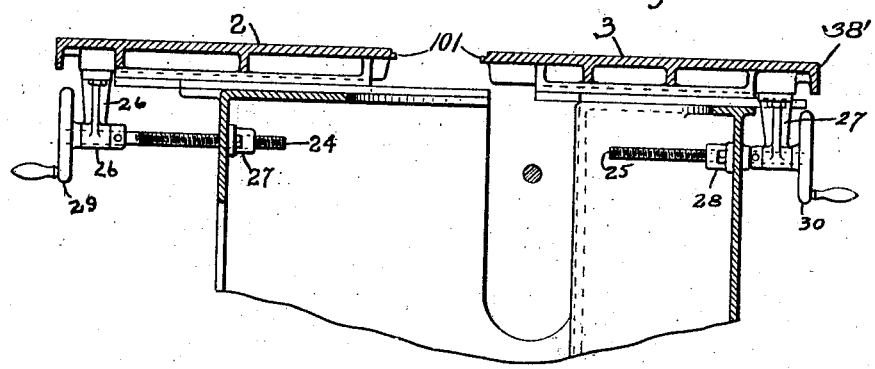
Figure 19:
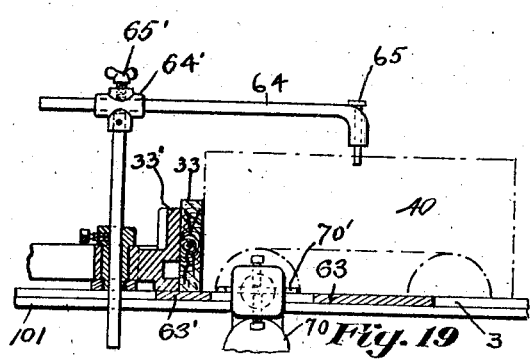

Fig. 15 is a plan of the fence or guide with the adjacent parts set to feed parallel to one of the straight sides of the table, Fig. 16 is a section on the line 16—16 of Fig. 15, Fig. 17 is a plan of the table with a table section interposed between the two sides of the table and core box, guide and cutter for cutting a circular groove in the bottom of the core box, Fig. 18 is a section on the line 18—18 of Fig. 1, Fig. 19 is a section on the line 19—19 of Fig. 17.

Figure 20:
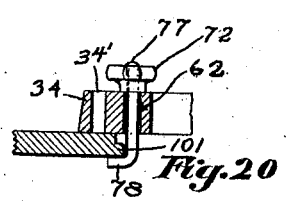

Fig. 20 is a section on the line 20—20 of Fig. 17.

In the drawing like references show like parts.

Referring to the drawing, 1 is a hollow upright stand or support for the machine upon which rests a table in two rectangular parts 2 and 3 (see Fig. 1) mounted so that they will slide from and toward each other.

Power is applied by means of the pulley 4 secured on the end of the main shaft 5, the shaft being located below the upper surface line of the table between the two sections of the same and parallel to the separated edges.

Crossing the main shaft and at right angles thereto is the saw arbor or tool arbor 6 connected to be rotated by the main shaft 5 by a mitre gear 7 on the main shaft 5 and a mitre gear 8 on the saw arbor (see Fig. 6).

At the junction of the main shaft and the saw arbor there is a suitable connecting casing 9.

The casing 9 contains an elongated journal bearing 10 for the saw arbor and a like journal bearing 11 for the main shaft 5.

There is also a sleeve 12 extending in line with the main shaft but on the opposite side in which is secured the end of the tilting shaft 13 whereby the saw arbor is rotated about the main shaft. The tilting shaft 13 extends through a vertical slot 13' on one side of the machine base (see Fig. 2).

Figure 2:
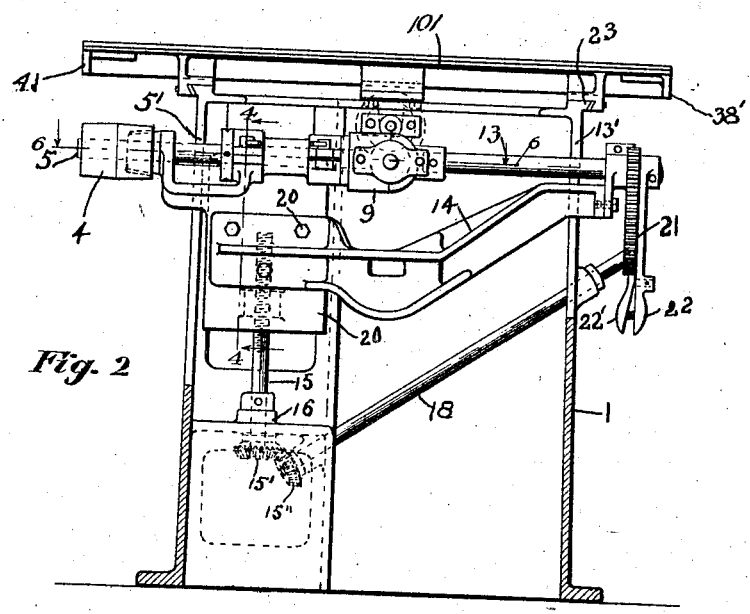
Fig. 2 is a section on the line 2—2 of Fig. 1.

The tilting shaft and the main shaft extend entirely across the machine base and through the vertical slot 5' which is opposite the vertical slot 13' (see Fig. 2).

Extending from the outer end of the tilting shaft 13 to the outer end of the main shaft is a bracket 14 which includes the vertically sliding block 20 (see Fig. 3).

Means are provided whereby the bracket 14 is raised and lowered in the vertical slots whereby the saw arbor and shaft are made to occupy different levels according to the work designed for it.

For the purpose of raising and lowering the bracket 14 with the main shaft 5 and tilting shaft 13 I provide an upright screw 15, the lower end of which is journaled in the fixed bracket 16 (Fig. 2). The upper end of said screw extends through a vertical screw threaded opening 17 in the bracket (see Fig. 4), to which is connected the journal bearing 11 (see Fig. 6).

On the lower end of the upright screw 15 is secured a bevel gear 15' which engages a bevel gear 15" so that the rotation of the gear 15" acts to rotate the upright screw 15 and to raise and lower the bracket 14 (see Fig. 2).

The rotation of the gear 15" is effected by a shaft 18 journaled in the supporting base 1 and projected outward through one corner of the base where it is rotated by a hand wheel 18' (see Fig. 1).

By operating the turning wheel 18' on the outside of the machine base it acts to rotate the inclined shaft 18 to raise and lower block 20 carrying the bracket 14 and connecting parts.

The operating shaft 18 passes through one corner of the hollow base 1 and is within easy reach of the operator of the machine, the block 20 carrying the bracket 14 slides vertically on suitable guides 19 and the hollow column supporting the machine (see Fig. 4).

The block 20 is also guided by the hollow column supporting the machine.

It will thus be seen that the rotation of the tilting shaft 13 rotates the saw arbor about the center of the main shaft and of the tilting shaft 13 placing the saw arbor 6 at any desired angle with the table.

This angle is indicated by quadrant 21 secured at the end of the tilting shaft 13. An operating lever 22 affixed to the shaft 13 enables the shaft to be turned to any desired angle indicated on the quadrant 21 (see Fig. 1).

The saw arbor is fixed in its adjusted position by teeth on the quadrant and a locking device 22' connected with the handle 22.

The table is held on the top of the supporting column 1 by means of a gib 23 enabling the two halves thereof to slide back and forth as stated (see Fig. 2). Each half of the table as herein shown, may be moved independently of the other half by means of two horizontal screws 24 and 25 (see Fig. 18).

The other end of each of these screws is journaled in brackets 26 and 27 each of said brackets being attached to one of the sliding sections 2 and 3 of the table, a pair of nuts 27 and 28 extend through the supports and two adjusting wheels 29 and 30 rotate the screws 24 and 25 to move back and forth the sections of the table.

When the saw 31 is in an upright position, and being used for ripping or crosscutting operations, it may be located in any desired position in the gap between the two halves of the table.

In Fig. 1 I have shown the saw, tilted at an angle of substantially 45 degrees from the horizontal, projecting through a slot in the saw-board 32. I provide a fence 33 which I employ in gauging or guiding lumber while being ripped or cross-cut, and in the manufacture of box moulding and the execution of core-box work in general.

The guide or fence 33 and the guide strip 36 are connected with a bracket 33' on its back side by means of a screw 33". The guide strip 36 extends rearwardly of the guide or fence 33 normally at right angles thereto between two clamping bars 37 which are clamped to it by clamping screws 37' (see Fig. 1).

The clamping screw 37' serves to clamp the jaw 37 to a bracket 38 which slides on a rib 38' from the edge of the table (see Fig. 2).

A quadrant 34, having an arcuate slot 34' therein, controls the angular relationship of the fence 33 with the guide strip 36 and the clamp screw 35 holds the quadrant and guide strip, relatively, in any desired angle.

It will be seen that by means of the adjustments indicated the fence 33 may be held in a position parallel with the face of the saw for ripping as shown in Fig. 1. It may be swung around to a position at right angles to the saw for cutting off or it may be brought in to any angle necessary for the work.

In Fig. 12 I have shown the saw arbor rotated to its position where the saw is parallel with the table and a short distance above it. The use of this position of the arbor will be evident to one using such a machine.

In Fig. 13 I show the saw at an angle of 45 degrees and extending through a slit in the saw board 32 as in Fig. 1.

In grooving for core-boxes, the saw-board 32 is replaced by bridges 63 and 63', these being interposed between the adjacent edges of the tables 2 and 3. The screws 24 and 25 act as means for bringing a pressure to bear against the bridges sufficient to firmly hold them in place. Ledges 101 project from beneath the adjacent edges of the tables to provide a seat for the bridges.

My machine is fitted to be used not only for a sawing machine for splitting and cutting off lumber but it may also be used as an irregular moulder by the use of a cutter head to be secured to either end of the saw arbor in place of the saw shown in Fig. 14.

One great advantage of a cutter head on my saw arbor, as shown, is it is in position to be tilted more or less if desired. Another great advantage is that the fence may slide in contact with any of the ribs 38' thus avoiding slots in the table.

By means of the several ribs 38', one on each side of the machine, my fence or guide is always in a position to slide parallel with one of the sides of the table or it can be placed so that the lumber may be guided by the surface of the fence or guide parallel with either of the sides of the table. In Fig. 11 I have illustrated the way in which lumber may be grooved with a narrow groove 93' made by cutter 93 to form a core box either straight or annular in form. In this figure the cutter 93 is set in its holder 92 shown for cutting the block 100. The cutter is set in a spindle 81 (Fig. 10). The cutter 93 cuts a narrow semicylindrical groove 93' for a core box (Fig. 11).

The tilting shaft 13 is set so that the tool 93 extends upward at an angle with the table of the machine.

An annular groove may now be made as indicated in Fig. 17. A pivot bar 64 (see Figs. 17 and 19), on one end of which is a pivoting pin 65, is slidably mounted in the socket 64', and adjustably fixed thereto by the screw 65'.

I provide means for clamping the segment or the fence solidly to the table so that the whole construction will be more substantial.

In Fig. 20 I illustrate my method of clamping the fence 33 rigidly to the table, the design embodying a bolt 77 which passes downwardly through an opening 62 in the segment portion of the fence, the lower end of the bolt having on its end a hook 78 which hooks under the edge of the table slot with a hand nut 72 to clamp the hook and consequently clamp the quadrant solidly in place connected with the table.

This clamping arrangement may be used to reinforce the bracing furnished by the guide strip 36 alone as when the core box arrangement is used as shown in Figs. 17, and 19 as described. The pivot pin 65 is thus held firmly and solidly in position and the strain on the strip 36 thus relieved.

According to my invention I secure to one end of the arbor the irregular rotary cutter or moulder.

Referring to Figs. 11, 12, 13 I show the saw attached to the end of the arbor nearest to the main shaft while in Fig. 14 I show the moulder or shaper or irregular moulder secured to the end farthest removed from the main shaft. The core box machine is shown in Figs. 7, 8, 9, 10 and 11. In Fig. 11 is shown the arrangement for cutting a narrow cylindrical cutter box.

Referring to Fig. 10, which represents a speed increasing mechanism, used principally in cutting small core-boxes, 70 is the housing or body portion of the device. Secured to its outer end, by the bolts 72, is a cover plate 71, decentered on which is a bearing 82, the latter in alignment with a somewhat smaller bearing 82', in the housing 70. Within these two bearings operates the spindle 81 upon which is cut or mounted a pinion 79. This pinion is engagable with the gear 78 which is provided with an entended hub 77 journalled in the bearing 77' in the housing.

At the end of the hub (77) are projections 74 which serve as keys and are adapted to engage the transverse key-way 76 cut centrally of the collar 75 (see Fig. 6), which latter, when the speed increasing mechanism is assembled on the main saw or tool arbor 6, enters the concentric bore 73, of the gear 78, and aligns the gear (78) with the spindle or arbor 6.

As the collar 75 is shrunk on, or otherwise fixed to the arbor 6, the latter, it will be seen, acts, through the inter-connecting parts, as the driving agent to rotate the spindle 81. The inner end of the spindle 81, at 80, is reduced in size and is provided with adjustable lock nuts 80' to hold the spindle (81) in position axially.

The speeding device is secured to the flanged hub 96 of the casing 9, by means of bolts passing through holes in the ears 70'', of the housing 70, and into tapped holes 95 in the casing flange.

On the outer end of the spindle 81 is a bored and threaded hole into which may be screwed the shank 83 of the large tool holder 90, or the shank 83' of the small tool holder 90',—either being adaptable of use in the speed increasing mechanism. In the large tool holder (90) a transverse hole 91 receives the cutting tool (not shown) and this latter is secured therein by the screw 92.

On the small cutting tool holder 90', shown in Fig. 9, is a threaded shank 91', over which is screwed an internally threaded sleeve 92'. At the outer end of this sleeve is drilled a transverse hole, into which is received the cutting tool 93. Screwing the sleeve on to the shank a sufficient distance will cause the end of the shank to abut on the cutting tool 93, holding the latter firmly in place in the hole in the end of the sleeve. Assuming that the cutting-tool spindle is rotated in a direction contra-wise to that which would advance the sleeve further on to the threaded shank, then the pressure applied to the end of the cutting tool in operation would keep a twisting strain on the sleeve, tending to hold the parts rigidly bound together.

In operating my machine as a core-box cutter, and with especial reference to Figs. 17 and 18, wherein are illustrated the parts as they appear in cutting an annular, semi-circular groove in the block 40, I first move the table 3, using hand-wheel 30, to its innermost position, or until the collar on the screw 25 abuts on the bearing nut 28, which latter thus serves as a stop to limit the inward travel of table 3. I next advance table 2 toward table 3, interposing the bridge plates 63 and 63', the movement of the table being accomplished by the actuation of the hand-wheel 29, with the result that the bridge plates are firmly locked between the two tables, and the latter separated by a spaced and predetermined distance.

The guide or fence 33 is next drawn across the tables, with the longitudinal face of the fence at a right angle to the adjacent edges of the tables. To accurately position the pivot bar 64, or more especially the pivot pin 65, about which the work must revolve while doing the cutting, I utilize the clamp bolt 77, which, abutting on the inner edge of the table 2, serves as a stop to establish a fixed relation, longitudinally of the cutter spindle, between the pivot point of the work, at 65, and the cutter in the tool-holder 90.

It is obvious that the cutter must be located on a radial line from the pivoting point of the work, with the axis of the cutter spindle operating at a right angle to this radial line (making a tangential cut), in order that a groove of true semi-circular form in cross section may be produced in the block of wood. It would therefore appear that the locking bolt 77 exercises a very important function beyond serving simply as a locking means for the inner end of the fence 33.

The foregoing description, with the illustrations in Figs. 17 and 18, applies more particularly to the larger core-box operations. In Fig. 11 I show the tool-holder used for smaller work,—the operation of handling, however, is essentially the same. The groove is here shown as a straight one, and this would require that the block be moved parallel with and contiguous to the fence (not shown), although it is possible to cut smaller grooves of annular form.

In shaper-tool cutting operations, the operator will often face the difficulty of not being able to make a smooth cut on account of the cross-grain of the wood. Observing Fig. 6, the main tool spindle is seen to be in one piece and therefore will rotate at all times in but one direction, but due to the method of applying the power to the spindle I may obtain either a right or left hand direction of rotation of the cutter, relative to the work, by simply reversing the spindle ends to bring either into working position, alternately. Figs. 14 and 15 illustrate the two positions of the cutter spindle, in vertical view, and it will be found that the cutting implements revolve clock-wise in one case and counter-clock-wise in the other.

As has previously been stated, the fence may be operated from either of the four sides of the table, and the locating and clamping mechanism being wholly beneath the table top, the latter is left perfectly smooth and unobstructed. Another feature is the placing, beneath the table, of the rib 101, thus eliminating the collection of dirt and chips in the guide ways when adjusting the fence.

Ordinarily, core-boxes are required to be cut with a semi-circular groove, but by disaligning the pivot bar with the cutter I am able to form a half-elliptical groove.

I claim:—

1. In a wood-working machine, the combination, with a hollow base member, a vertically movable slide, a drive shaft journalled in said slide, a double-ended cutter spindle, adapted to receive cutters at each end thereof and journalled in oscillating bearings disposed at a right angle to the said drive shaft, the plane through both the said shaft and the said spindle being coincidental, and means to actuate said shaft, of means to rotate said spindle by said shaft whereby a change of direction of rotation of the working cutter may be had by oscillating the spindle, whereby each end thereof, alternately, may be brought into working position, two tables on said base member, adaptable of horizontal movement only thereon, and in a direction normal to the said drive shaft, a fixed stop to limit the inward movement of one of said tables, a gauge, a pivoting-bar on said gauge, a pivoting pin on said pivoting-bar, about which the work to be operated on may revolve, bridge-plates interposed between the adjacent edges of said tables, and means on said gauge, co-acting with the movement of one of said tables, whereby the locating of said pivot pin in alignment with said cutters and the clamping of said bridge-plates between the two said tables may be brought about simultaneously.

2. In a wood-working machine, the combination, with a base member, a vertically movable slide mounted on said base, shaft bearings on said slide, a shaft revoluble in said bearings, means to actuate said shaft, a cutter spindle journalled in bearings, their axes disposed at a right angle to the axis of said shaft and oscillatively movable thereabout and cutters fixed in the ends of said cutter spindle, of a table, 3, superimposed on said base member and susceptible of horizontal movement, only, thereon, said movement being in a direction normal to the axis of said shaft, a fixed stop limiting the inward movement of said table, a second table, 2, mounted on said base member and adapted to horizontal movement, only thereon, to and from said first mentioned table, the top surfaces of said tables to be always in alignment, horizontally projecting ledges on the adjacent edges of said tables, extending inwardly, bridge-plates adapted to seat on said ledges with the top surfaces in alignment with the top surfaces of said tables, a gauge, a pivoting-bar on said gauge, a pivoting-pin on said pivoting bar, means to locate said pivoting-pin in alignment with said cutter, and means to locate said pivoting-pin in a plurality of positions, radially of said cutter, whereby annular grooves, for core-boxes, of various diameters may be cut.

3. In a wood-working machine, the combination, with a base member, a divided table, superimposed, and slidable thereon, a drive shaft, a cutter-spindle driven by said shaft, and means to actuate said shaft, of a gauge, operable, alternately, on all of the four outer sides of said table, means, wholly beneath, and forming a part of, said table, to guide said gauge along the edges thereof, means to fixedly locate said gauge in any one of a plurality of different positions on each of the outer edges of said table, a pivoting-pin on said gauge and means to elevate said cutter spindle whereby a groove may be cut in the work while being rotated on, and held centralized by, said pivoting-pin.

4. In a wood-working machine, the combination, with a base member, a divided table having a smooth and unobstructed top surface, a drive shaft, a cutter-spindle and means to actuate said spindle, of a gauge, adapted to slide over the upper surface of said table, ribs, serving as guide-ways, depending from the outer edge of each of the four sides of said table, said ribs being shortened for a spaced distance from each corner of said table for the purpose of assembling the said gauge from the ends only of either of the sides thereof, a grooved bracket on said gauge, adapted to encompass said ribs whereby said gauge may be held against lifting while being adjusted to different positions on said table side, a clamp screw to fixedly locate said gauge on said guide-way, a pivoting-pin on said gauge about which the work may revolve while being operated on, and means on said gauge, co-acting with the movement of said tables, whereby the work may be presented to the cutting tool in such a manner, while revolving on said pivoting-pin, as to obtain other than a tangential cut thereon.

FRANK E. THOMES.